(12) United States Patent
Stephens et al.

(10) Patent No.: US 9,509,225 B2
(45) Date of Patent: Nov. 29, 2016

(54) EFFICIENT LLC RESONANT CONVERTER HAVING VARIABLE FREQUENCY CONTROL AND FIXED FREQUENCY PHASE-SHIFT PWM

(71) Applicant: Continental Automotive Systems, Inc., Auburn Hills, MI (US)

(72) Inventors: Dennis L. Stephens, Barrington, IL (US); Young G. Kang, Glenview, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 123 days.

(21) Appl. No.: 14/487,228

(22) Filed: Sep. 16, 2014

(65) Prior Publication Data

US 2016/0079862 A1 Mar. 17, 2016

(51) Int. Cl.
  *H02M 1/08* (2006.01)
  *H02M 3/337* (2006.01)
  *H02M 1/00* (2006.01)
  *H02M 7/5387* (2007.01)

(52) U.S. Cl.
  CPC ... *H02M 3/3376* (2013.01); *H02M 2001/0058* (2013.01); *H02M 2007/53878* (2013.01)

(58) Field of Classification Search
  CPC .......................... H02M 1/08; H02M 3/33515
  USPC ..................................................... 363/17, 98
  See application file for complete search history.

(56) References Cited

U.S. PATENT DOCUMENTS

| | | | | |
|---|---|---|---|---|
| 4,672,528 | A | * | 6/1987 | Park .................... H02M 3/3376 363/17 |
| 4,951,185 | A | * | 8/1990 | Schutten ............. H02M 3/3376 363/17 |
| RE33,866 | E | * | 3/1992 | Schutten ............. H02M 3/3376 363/17 |
| 8,525,428 | B2 | * | 9/2013 | Chen .................... H02M 3/337 315/209 R |
| 9,287,795 | B2 | * | 3/2016 | Ma ....................... H02M 3/3388 |
| 2016/0079862 | A1 | * | 3/2016 | Stephens ........... H02M 3/33507 363/21.02 |
| 2016/0079869 | A1 | * | 3/2016 | Elias-Palacios .. H02M 3/33546 363/21.04 |

\* cited by examiner

*Primary Examiner* — Jeffrey Sterrett (57) ABSTRACT

An output voltage of an LLC resonant converter circuit is received. The received output voltage is analyzed to determine whether the received output voltage is within an acceptable operational range. When the output voltage is not within the acceptable operational range and the operational frequency is below a maximum predetermined frequency, the operational frequency of the LLC resonant converter circuit is adjusted. The adjustment of the operational frequency is effective to change the output voltage to a value that is within the acceptable operational range. When the output voltage is not within the acceptable operational range and the operational frequency is above the maximum predetermined frequency, a phase shift in the LLC resonant converter circuit is adjusted. This adjustment is effective to change the output voltage to a value that is within the acceptable operational range.

13 Claims, 5 Drawing Sheets

EFFICIENT LLC RESONANT CONVERTER HAVING VARIABLE FREQUENCY CONTROL AND FIXED FREQUENCY PHASE-SHIFT PWM

TECHNICAL FIELD

This application relates to electrical conversion systems and, more specifically, to LLC resonant conversion systems and approaches including other forms of LC converters and LCC converters.

BACKGROUND OF THE INVENTION

Batteries are used to power various types of systems. For instance, one or more batteries may be used to power electrical systems such as those used in or associated with power electric vehicles (EVs) or hybrid electric vehicles (HEVs). The batteries used in these systems can be configured as packs of batteries that have voltages in the 150-400 volt range.

However, the accessories that are used in vehicles typically require voltages much less than 150-400 volts. As such, the vehicle must have a conversion apparatus that reduces the battery voltage from the 150-400 volts to a smaller value. One example of such a conversion device is a DC-DC converter. In some examples, the DC-DC converter reduces the voltage from the 150-400 volt range to a 12 volt value range (10-16V)

One example of a DC-to-DC converter is an LLC resonant converter. Typically, the LLC resonant converter utilizes two inductors and a capacitor that couple to a transformer. One of the inductors (Lm) can be integrated into the transformer as the magnetizing inductance The LLC resonant converter transforms an input voltage (e.g., 200 volts) to a voltage value that can be used by accessories of the vehicle (e.g., 12 volts).

Although DC-DC converters are used to transform voltages, they have several operational limitations and issues. For instance, battery voltages may vary over time and it is still desired to keep up the same output voltage so that the accessories can function. The output voltage needs to be controlled depending on temperature and accessory operation. The devices also need to be low cost and efficient, or the vehicle will become prohibitively expensive to purchase and/or operate.

Previous approaches at overcoming these limitations have generally had various drawbacks. Typical operation of an LLC converter is to vary the switching frequency in response to load and/or input voltage variation. Using frequency alone limits the range of input voltage from minimum to maximum. As load current is reduced on the 12 V, the output voltage tends to rise. To compensate, the frequency has to be increased to correct the voltage. In this type of converter the frequency would have to increase multiples of the nominal switching frequency. This increased frequency causes increased switching losses of the switching FETs and output diodes and loss of efficiency.

Another prior approach for the light load condition is to skip a cycle. That is, to apply a maximum frequency that has minimum switching loss and to turn on and off that frequency at a slower rate than switching frequency to regulate the output voltage. As the load is reduced, the skip cycling causes ripple on the output voltage as well as possible audible noise from the converter. The skip cycling method still has a limited input voltage range.

Another prior approach is to apply a minimum load resistor in the converter so the load is never reduced enough to create these undesirable conditions. This extra load resistor reduces efficiency of the converter and is not desirable. Most of these designed LLC converters are limited in input voltage range as well as load range.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

In the approaches described herein, an LLC resonant converter circuit operates over a wide range of voltages and loads as well as over a wide range of frequencies. In the approaches provided, the input voltage and/or the load to the LLC resonant converter circuit may change, but the output voltage is maintained at approximately a constant value (e.g., 12 volts). Consequently, vehicle components that utilize the voltage value provided at the output of the DC-DC conversion circuit are always supplied with a sufficient amount of voltage to operate.

In one aspect, the LLC resonant converter circuit operates in two modes of operation. In a variable frequency control mode (the first mode of operation), a controller receives an output voltage (and potentially other parameters such as an input voltage and a load current). The circuit operates at particular Q value, the Q value being an indication of the resonance maximum gain of the circuit for a given load. A change in the frequency of operation of the LLC resonant converter conversion circuit changes the gain of the LLC resonant converter circuit, and this modification in turn changes the output voltage of the LLC resonant converter circuit. In other words, by adjusting the frequency of operation of the LLC resonant converter circuit the output voltage of the LLC resonant converter circuit can be changed or altered even when the input voltage of the LLC resonant converter circuit changes.

In a second mode of operation, fixed frequency phase shifting pulse width modulation is performed in the LLC resonant converter circuit. In operational terms, the system may be operating above a predetermined maximum frequency value and above a predetermined minimum gain value. It is desired to obtain less output voltage than available at this maximum frequency operating point. To accomplish this, the circuits provided herein utilize a transistor bridge with pairs of transistors. A controller adjusts the activation of the input bridge transistors to change the overlap of two individual signals produced by the bridge that are summed to become a bridge output signal. The amount of overlap of the two individual signals is a measure of the phase difference between the two individual signals. The present approaches allow the output voltage to be either adjusted up or down based upon the amount of overlap as between the signals even as the input voltage changes. It will be appreciated that in this second mode of operation, the frequency of operation of the LLC resonant converter circuit is not changed.

Figure 1:
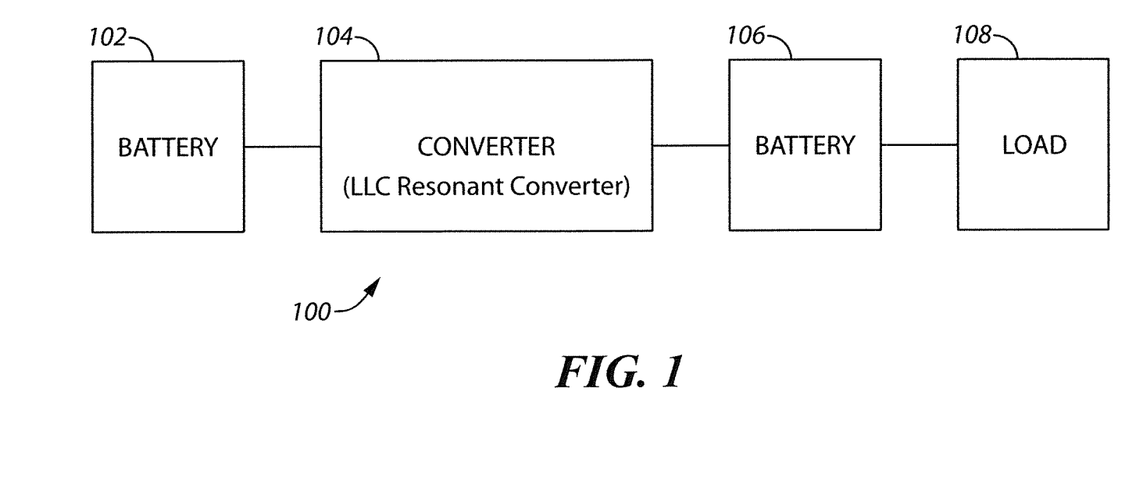
FIG. 1 comprises a block diagram of a system that maintains output voltage according to various embodiments of the present invention.

Referring now to FIG. 1, one example of an overall system 100 is described. The system 100 includes motor/high voltage battery block 102, a converter block 104 (described below), a low voltage battery 106, and a load 108.

The motor/high voltage battery block 102 includes a battery that outputs a particular DC voltage. In one example, the battery block is a pack of batteries that outputs a DC voltage in the 150-400V range. Other examples of voltages may also be used. It will also be understood that although the present approaches are described herein as being used within a vehicle, that these approaches may also be deployed in other environments or with respect to other types of applications.

The converter block 104 (described below) is an LLC converter circuit that converts the voltage from one DC value to another value. In one example, the converter block 104 lowers the voltage from approximately 200 volts to approximately 12 volts. Other values are possible.

In the example system of FIG. 1, the battery 106 is a low voltage battery and may in one example provide a voltage of 12 volts to the load 108. Other voltages are possible. The converter block 104 charges the battery 106.

The load 108 may be any component that uses the battery 106 for power. In one example, the load may be one or more vehicle components such as windshield wipers, the vehicle radio, the vehicle lights, or the sound system of the vehicle to mention a few examples. Other examples are possible.

In another example of the operation of the system of FIG. 1, an output voltage of the LLC resonant converter circuit is received. The received output voltage is analyzed to determine whether the received output voltage is within an acceptable operational range. When the output voltage is not within the acceptable operational range and the operational frequency is below a maximum predetermined frequency, the operational frequency of the LLC resonant converter circuit of the converter block 104 is adjusted. The adjustment of the operational frequency is effective to change the output voltage to a value that is within the acceptable operational range.

When the output voltage is not within the acceptable operational range and the operational frequency is above the maximum predetermined frequency, a phase shift in the LLC resonant converter circuit of the converter block is adjusted. This adjustment is effective to change the output voltage to a value that is within the acceptable operational range.

Figure 2A:
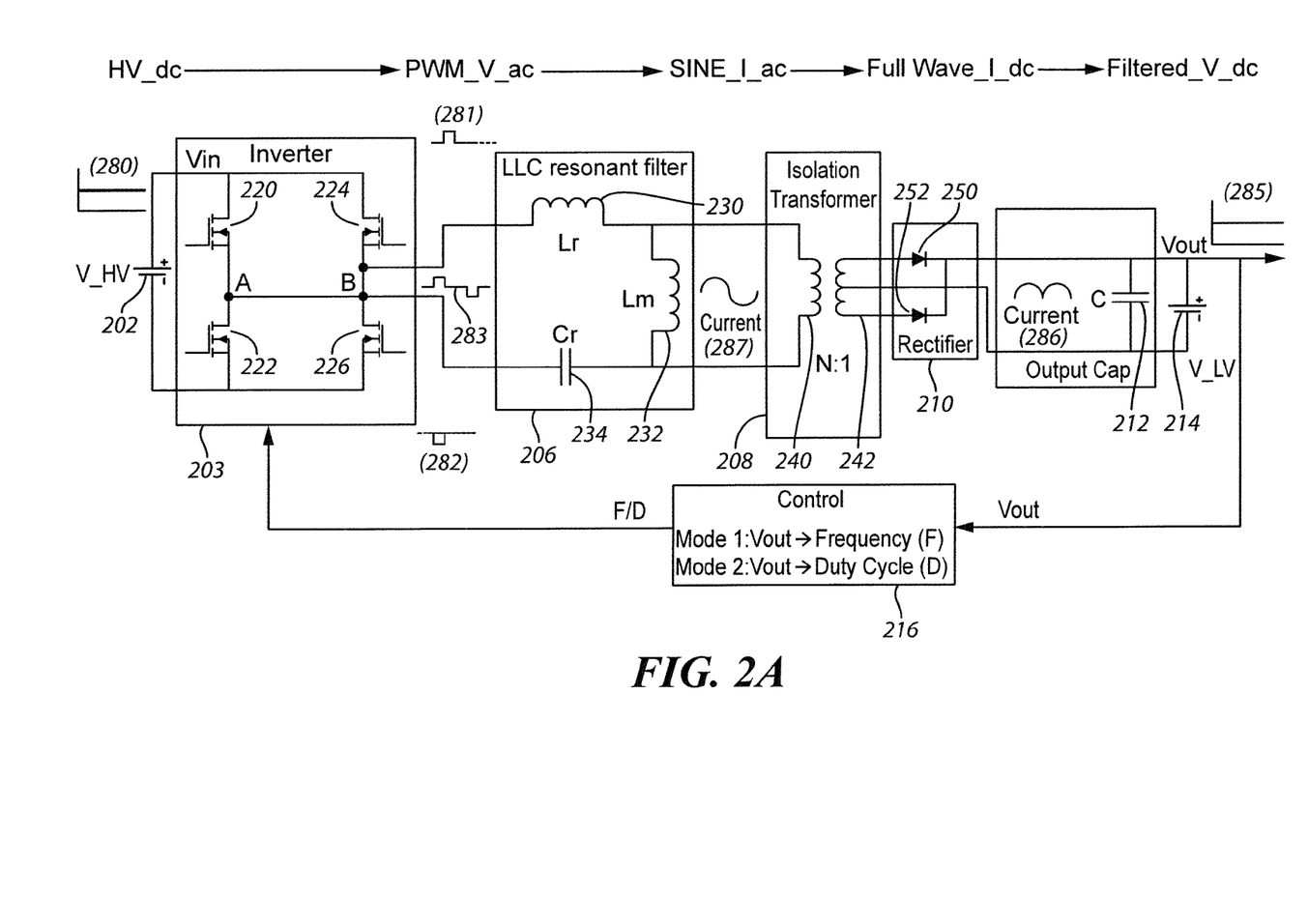
FIG. 2A comprises a circuit diagram of a circuit that operates to maintain output voltages according to various embodiments of the present invention.

Referring now to FIG. 2A, a system 200 includes a high voltage battery 202, an inverter 203, an LC resonant filter 206, an isolation transformer 208, a rectifier 210, an output capacitor 212, a low voltage battery 214 and a controller 216. The low voltage battery 214 couples to accessories at the output of the circuit.

The high voltage battery 202 includes a battery that outputs a particular voltage. The inverter 202 includes a first transistor 220, a second transistor 222, a third transistor 224, and a fourth transistor 226. In one example, the transistors 220, 222, 224, and 226 are MOSFETS. The controller 216 controls the operation of (activates and deactivates) the transistors 220, 222, 224, and 226.

The LC resonant filter 206 includes a first inductor 230, a second inductor 232, and a capacitor 234. Inductor 232 may be eliminated and replaced with the magnetizing inductance of coil 240 in transformer 208. The isolation transformer 208 includes a first winding 240 and a second winding 242. Voltage is transformed from a first value to a second value across the windings 240 and 242.

The rectifier 210 includes a first diode 250 and a second diode 252. The rectifier performs rectification function on the voltage and current waveform received from the transformer 208. The output capacitor 212 stores energy for use by the low voltage battery 214

The controller 216 controls the deactivation of the transistors 220, 222, 224, and 226. A high voltage DC signal 280 is supplied by the battery. A first signal 281 and a second signal 282 are produced by the inverter by the selective actuation of the transistors 220, 222, 224, and 226 under the control of the controller 216. The signals 281 and 282 are summed into signal 283, which is a pulse width modulated (PWM) alternating current (AC). The degree of overlap (phase difference) is adjusted by adjusting the signals relative to each other. The LC resonant filter 206 converts the signal 281 into a sinusoidal current 284, which is converted and rectified into current waveform 286 by the isolation transformer 208 and the rectifier 210.

In one example of the operation of the circuit of FIG. 2A, the circuit is operated in two modes. A first mode is a variable frequency control mode. In this mode, the controller 216 receives an output voltage 285. The controller may receive other inputs such as the input voltage 280 and the load current. The circuit is operating according to a particular Q value curve. The controller 216 can change the frequency of operation (i.e., how often or frequently the transistors 220, 222, 224, and 226 are activated and deactivated) and this changes the gain of the DC-DC circuit, and this changes the output voltage of the circuit. In other words, the controller, by adjusting firing of the transistors 220, 222, 224, and 226 moves the operation of the circuit along the Q line by adjusting the frequency, and this adjusts the output voltage. Consequently, even though the input voltage drops the output voltage is maintained in this operation.

In a second mode, fixed frequency phase shifting pulse width modulation is performed. Operation is above a predetermined maximum frequency value and below a predetermined minimum gain value. It is desired to maintain the output voltage at approximately the same level even when the input voltage changes. In this case, the controller 216 adjusts the activation of the input bridge transistors 220, 222, 224, and 226 to adjust the overlap between the signals 281 and 282.

Figure 2B:
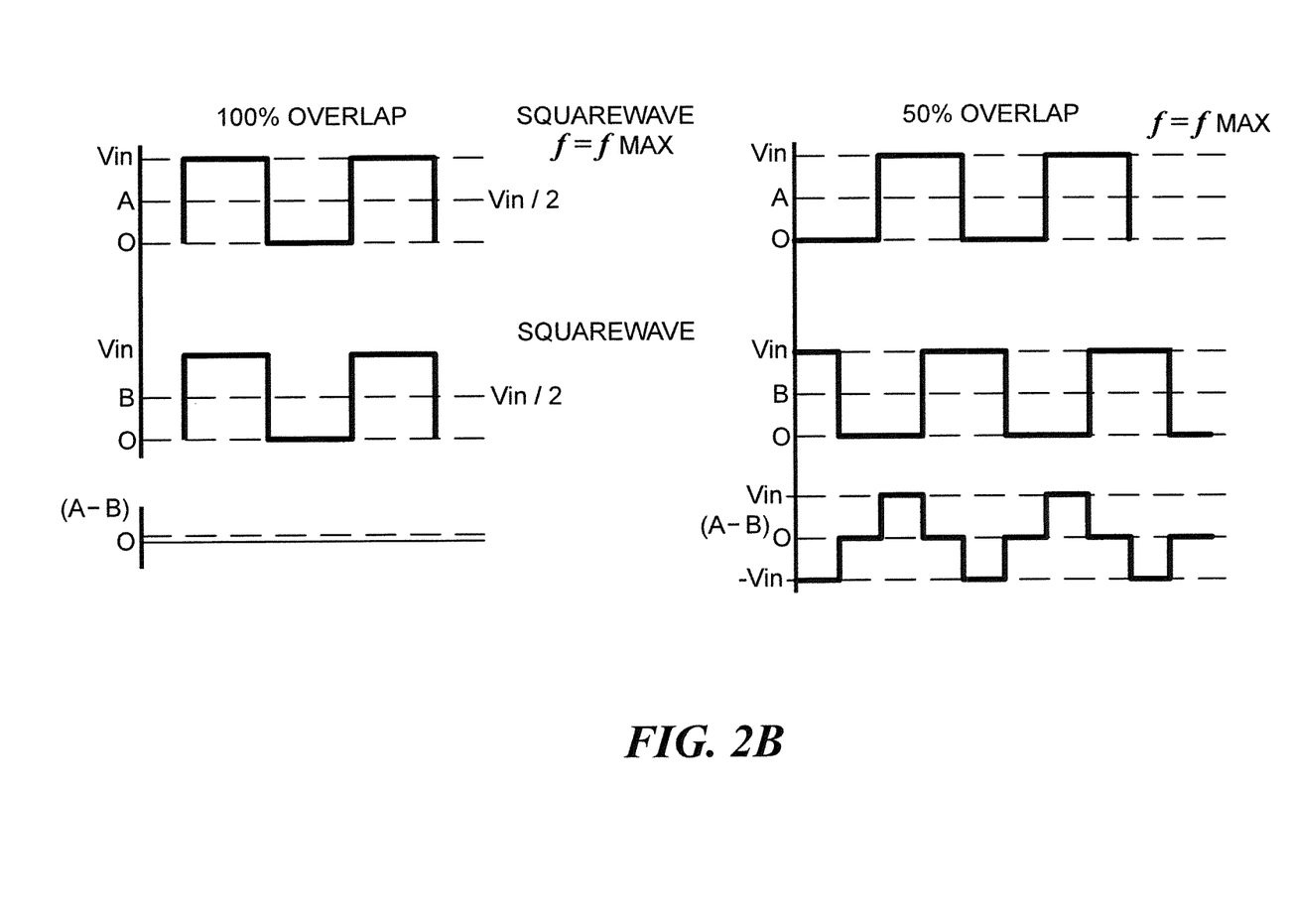
FIG. 2B comprises one example of a waveform diagram showing aspects of the operation of the circuit of FIG. 2A.

Referring now to both FIG. 2A and FIG. 2B, signal 281 is the connection point of the outputs of transistors 220 and 222 referred to as point A in FIG. 2B. Signal 282 is the connection point of the output of transistors 224 and 226 referred to point B in FIG. 2B. Point A and Point B are square waves of a particular frequency. In the first mode, the frequency of these square waves is adjusted to regulate the voltage. Point A and Point B square waves are non-overlapping and 180 degrees out of phase with each other. As either the input voltage increases and/or the load current decreases, the LLC gain needs to be reduced to limit the output voltage to the required level. Increased frequency reduces the gain, but when the frequency has reached a practical maximum limit, the mode of operation switches to the phase shifted second mode. The phase relationship between point A and point B, are changed by 216 to overlap, reducing the out-of-phase relationship to less than 180 degrees. As the overlap increases the gain of the converter decreases. This adjustment of the signals allows the output voltage to be either adjusted up or down. As shown in FIG. 2B, a 100% over lap (shown on the left side of FIG. 2B) produces 0 volts output voltage into the LLC resonant filter, while a 50% overlap produces the waveform shown on the right side of FIG. 2B.

In a first example, the transistors 220, 222, 224, and 226 are operated so as the signals 281 and 282 are 180 degrees out of phase. In other words, there is no overlap between the signals 281 and 282. The signals 281 and 282 are summed creating the waveform 283. Then, the controller 216 adjusts the activation of the transistors 220, 222, 224, and 226. This causes the signals 281 and 282 to overlap. The signals 280 and 281 are again summed producing a modified version of the waveform 283. As the amount of overlap of the signals 281 and 282 increases, the output voltage decreases. As the amount of overlap between the signals 281 and 282 decreases, the output voltage of the circuit of FIG. 2A increases. In this way the voltage at the output of the circuit of FIG. 2A can be controlled without adjusting the frequency of operation of the circuit (e.g., how frequently or quickly the transistors 220, 222, 224, and 226 are actuated).

Various overlap percentages are possible. It will be appreciated that in the variable frequency control mode (described above and elsewhere herein) there is 0% overlap of the signals.

Figure 3:
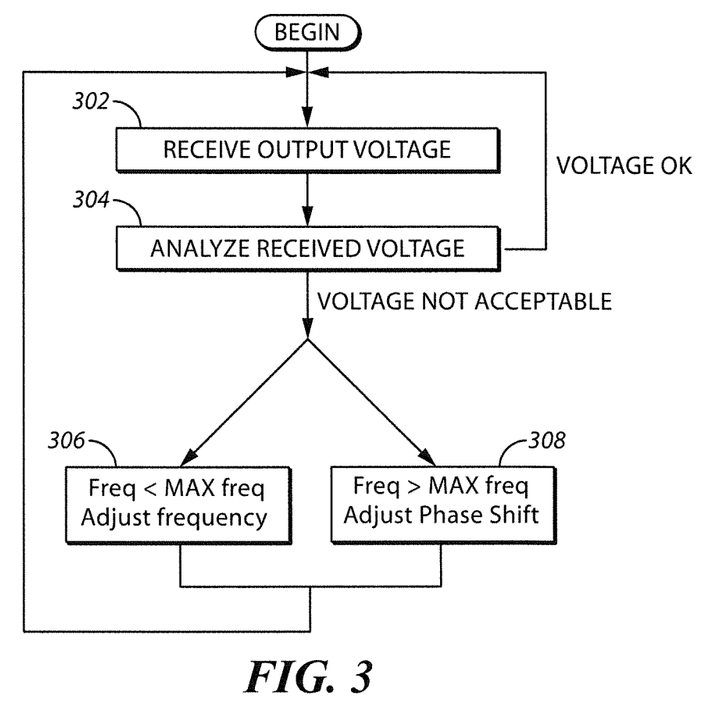
FIG. 3 comprises a flowchart of an approach for maintaining output voltages according to various embodiments of the present invention.

Referring now to FIG. 3, an approach of operating a LLC resonant converter circuit is described and in one example uses the circuit shown in FIG. 2. The LLC resonant converter circuit includes a resonant filter. The LLC resonant converter circuit is operated at an operational frequency and has an inverter coupled to the resonant filter that produces a first waveform and a second waveform. The first waveform has a phase shift with respect to the second waveform.

At step 302, an output voltage of the LLC resonant converter circuit is received. At step 304, the received output voltage is analyzed to determine whether the received output voltage is within an acceptable operational range.

At step 306, when the output voltage is not within the acceptable operational range and the operational frequency is below a maximum predetermined frequency, the operational frequency of the LLC resonant converter circuit is adjusted. The adjustment of the operational frequency is effective to change the output voltage to a value that is within the acceptable operational range.

At step 308, when the output voltage is not within the acceptable operational range and the operational frequency is above the maximum predetermined frequency, a phase shift in the LLC resonant converter circuit is changed to adjust the output voltage to a value that is within the acceptable operational range. Consequently, the output voltage is changed without adjusting the frequency of operation with these later conditions. At the end of this process, the loop begins again to 302. Output current and input voltage are monitored as well. If the input voltage is too low, the converter can either stop operation or operate at the min operating frequency not supplying enough gain to maintain the desired output voltage. If the output current exceeds a predetermined level, the phase shift of the second mode or the frequency of mode on is adjusted to maintain that constant current instead of voltage. The current fault condition described can be caused by an overload of the output, or a short circuit. If the current fault condition exists greater than a predetermined amount of time, controller (e.g., controller 216 in FIG. 2A) can shut off the converter or lower the fault current in response to a preprogrammed algorithm.

Figure 4:
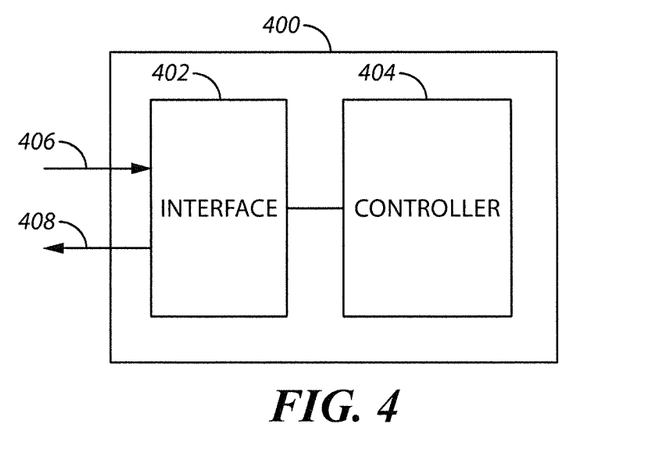
FIG. 4 comprises a block diagram of an apparatus that maintains an output voltage according to various embodiments of the present invention.

Referring now to FIG. 4, an apparatus 400 that implements the present approaches and includes an interface 402 and a processor device 404. The apparatus 400 that controls an LLC resonant converter circuit. The converter circuit 400 includes a resonant filter and the LLC resonant converter circuit is operated at an operational frequency and having an inverter coupled to the resonant filter that produces a first waveform and a second waveform, the first waveform having a phase shift with respect to the second waveform, the apparatus comprising:

The interface 402 has an input 406 and an output 408. The input 406 is configured to receive an input voltage of the LLC resonant converter circuit. Other inputs may be received such as the output voltage of the circuit and the current in the load.

The processor device 404 is coupled to the interface 402. The controller 402 is configured with a maximum frequency of operation which the LLC resonant converter circuit will be operated. When the output voltage needs to be adjusted and the operational frequency is below the maximum frequency, the operational frequency is adjusted via the output 408 of the interface 402 to adjust the output voltage to a desired value. When the output voltage needs to be adjusted and the operational frequency is above the maximum frequency, the phase shift in the LLC resonant converter circuit is adjusted via the output 408 of the interface 402 to adjust the output voltage to a desired value.

Figure 5:
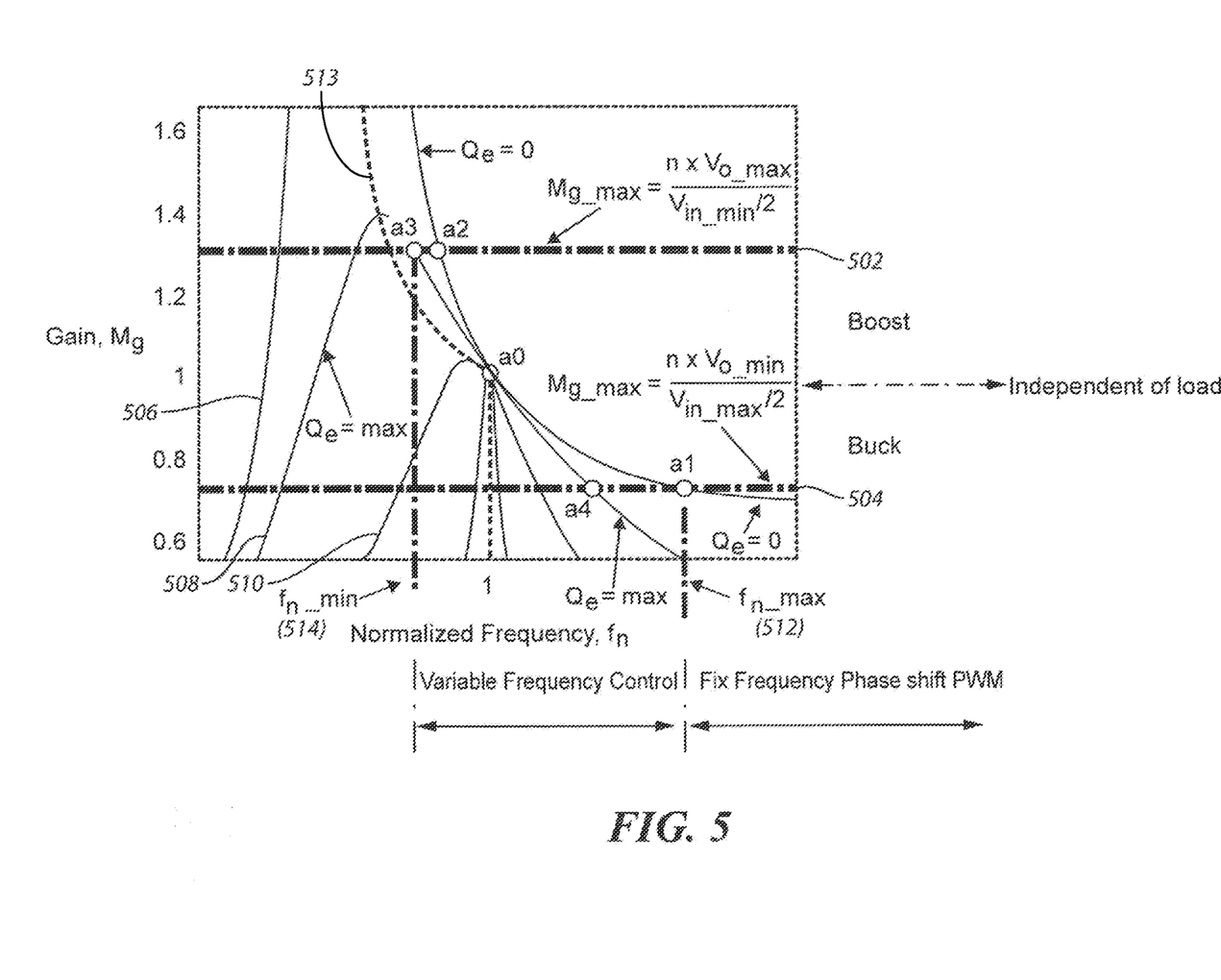
FIG. 5 comprises a graph showing various aspects of operation of the present approaches according to various embodiments of the present invention.

Referring now to FIG. 5, one example of the operation of the present approaches is described. As shown in FIG. 5, the x-axis is the gain. The y-axis is normalized frequency. A maximum gain 502 can be set to $n*Vo\_max/(Vin\_min/2)$, where n is an integer, Vo_max is the maximum output voltage, and Vin_min, is the minimum input voltage.

A minimum gain 504 can be set to $n*Vo\_min/(Vin\_max/2)$, where n is an integer, Vo_min is the minimum output voltage, and Vin_max, is the maximum input voltage. Operating curves 506, 508, and 510 represent different q-values. Different points on the curves a0, a1, a2, a3 and a4 represent operating points that may or may not need to be changed. It is desired to operate the system between a maximum frequency 512 (fn_max) and a minimum frequency 514 (fn_min). Operation in the first mode of operation is restricted to the area enclosed by a0, a1, a2, a3, and a4. This is accomplished by choices of the LLC values, input voltage range and load range. In the case of Q range 510 the minimum frequency is larger than fn_min. To maintain efficient operation, the range of operation must be to the right of boundary condition 513. Operation to the left of 513 causes excessive power loss in the inverter transistors (e.g., inverter transistors 220, 222, 224, and 226). Above a gain of 1, the system operates in a boost mode where the output voltage increases the input voltage. Below a gain of 1, the system operates in a buck mode where the output voltage is less than the input voltage.

Variable frequency control is used between fn_min and fn_max. As described, this moves the operating point along the curves 506, 508, or 510. However, if the normalized frequency is above fn_max, the fix frequency phase shift PWM approach is used. Because at a particular frequency, the gain is fixed, the controller can change the phase shift to change the gain. Consequently, the amplitude of the voltage changes.

It will be understood that the input voltage may change, but still have to maintain approximately the same and relatively constant output voltage (e.g., 12 volts). As will be appreciated, there is not a single way to achieve these results and maintain efficient system operation and two ways are utilized. Consequently and for a wide range of input voltages, the present approaches provide and maintain the desired output voltage (e.g., 12 volts).

To take one example, when the input voltage decreases from 200 to 100 volts, this would decrease the output voltage from 12 volts to 6 volts. This voltage decrease is not acceptable since devices (e.g., vehicle accessories) are not able to operate at this voltage level. Advantageously, the approaches described herein keep and maintain the output voltage at approximately 12 volts no matter where in the frequency range the system is operating.

It should be understood that any of the controllers described herein may utilize one or more computing devices to implement its various functionality. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described above can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices (and utilized by the controller) and described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method of operating a LLC resonant converter circuit, the LLC resonant converter circuit including a resonant filter, the LLC resonant converter circuit being operated at an operational frequency and having an inverter coupled to the resonant filter that produces a first waveform and a second waveform, the first waveform having a phase shift with respect to the second waveform, the method comprising:

receiving an output voltage of the LLC resonant converter circuit;

analyzing the received output voltage to determine whether the received output voltage is within an acceptable operational range;

when the output voltage is not within the acceptable operational range and the operational frequency is below a maximum predetermined frequency, adjusting the operational frequency of the LLC resonant converter circuit, the adjusting of the operational frequency being effective to change the output voltage to a value that is within the acceptable operational range such that efficient operation of a plurality of inverter transistors is maintained by operating at a frequency above a boundary condition and within a gain-versus-frequency area bounded by a plurality q-value curves between a minimum gain and a maximum gain, wherein the plurality of q-value curves each have distinct peak q-values relative to one another;

when the output voltage is not within the acceptable operational range and the operational frequency is above the maximum predetermined frequency, adjusting a phase shift in the LLC resonant converter circuit to adjust the output voltage to a value that is within the acceptable operational range.

2. The method of claim 1, wherein the first waveform and the second waveform are produced by the actuation of pairs of transistors.

3. The method of claim 1 wherein the overlap between the two waveforms is approximately 180 degrees.

4. The method of claim 1 wherein the overlap between the two waveforms is shifted from approximately 180 degrees to a value substantially below 180 degrees.

5. The method of claim 1, wherein the output voltage is desired to be approximately 12 volts.

6. The method of claim 1, wherein the output voltage is used to power an accessory of a vehicle.

7. The method of claim 1, wherein the voltage is transformed down to a voltage of approximately 12 volts.

8. An LLC resonant converter circuit, comprising:

an inverter circuit, the inverter circuit producing a first waveform and a second waveform that are summed into a third waveform;

a resonant filter coupled to the inverter circuit, the resonant filter receiving the third waveform and converting the third waveform into a sinusoidal waveform;

a transformer isolator that converts the sinusoidal waveform from a first voltage to a second voltage;

a controller coupled to the inverter circuit;

a rectifier and output circuit coupled to the isolation transformer;

wherein the inverter is operated at an operational frequency by the controller and wherein the controller operates such that the first waveform has a phase shift with respect to the second waveform;

wherein the controller is coupled to the output circuit, the controller configured to, based upon a maximum frequency of operation, when the output voltage needs to be adjusted and the operational frequency is below the maximum frequency, adjust the operational frequency of operation of the inverter circuit to adjust the output voltage to a desired value such that efficient operation of a plurality of inverter transistors is maintained by operating at a frequency above a boundary condition and within a gain-versus-frequency area bounded by a plurality q-value curves between a minimum gain and a maximum gain, wherein the plurality of q-value curves each have distinct peak q-values relative to one another, and when the output voltage needs to be adjusted and the operational frequency is above the maximum frequency, adjust the phase shift of the first waveform and the second waveform to adjust the output voltage to a desired value.

9. The circuit of claim 8, wherein the first waveform and the second waveform are produced by the actuation of pairs of transistors.

10. The circuit of claim 8 wherein the overlap between the two waveforms is approximately 180 degrees.

11. The circuit of claim 8 wherein the overlap between the two waveforms is shifted from approximately 180 degrees to a value substantially below 180 degrees.

12. The circuit of claim 8, wherein the output voltage is desired to be approximately 12 volts.

13. The circuit of claim 8, wherein the output voltage is used to power an accessory of a vehicle.

* * * * *